Patented Aug. 26, 1924.

1,506,537

UNITED STATES PATENT OFFICE.

MAX LANGHEINRICH, OF MUNICH, GERMANY, ASSIGNOR TO GRAPHITWERK KROPFMÜHL A. G., OF MUNICH, BAVARIA, GERMANY.

PROCESS OF PURIFYING GRAPHITE.

No Drawing.    Application filed August 24, 1921.    Serial No. 494,871.

*To all whom it may concern:*

Be it known that I, MAX LANGHEINRICH, citizen of Germany, residing at Munich, Bavaria, Germany, have invented certain new and useful Improvements in a Process of Purifying Graphite, on which an application has been filed in Germany on March 12, 1919, Serial No. G. 47928—IV—12 i; and I do hereby declare the following to be a full, clear, and exact description of the invention, such as will enable others skilled in the art to which it appertains to make and use the same.

This invention relates to a process of purifying graphite by electric current. In the production of artificial amorphous graphite out of a certain anthracite a product is obtained which, while it is free of sulfur still contains a considerable quantity of ingredients of a cinerary nature which may be removed by heating the product for some time in an electric furnace. However, heating alone is insufficient for purifying native graphite. Tests have shown that when native graphite is exposed to strong heat, owing to impurities and ingredients present in the graphite, a considerable part of it will be burned to carbonic oxide, while another portion will be converted into carbides, although the latter will decompose again in very high temperatures and leave an amorphous graphite as a product. Depending on the quality of the crude graphite, this amounts only to an infinitesimal portion of the quantity of graphite which had been originally present therein. Moreover, the product obtained is not the valuable crystalline graphite in scales, but only an amorphous-pseudomorphous graphite.

The herein described process will obviate these disadvantages. It consists chiefly in heating the graphite mixed with coal up to temperatures of more than 2200 degrees Celsius, and exposing it at the same time to sublimation. The compounds resulting therefrom may be secured by individually separating these substances from the vapors at temperatures of different heights, each substance being separately subjected to further treatment.

Preferably sufficiently disintegrated crude graphite or graphite brought to a uniform carbon content by mixing, washing or dry grinding should be united with pulverized coal, charcoal, anthracite or coke, and then the mixture heated by means of a single or multiphase alternate or direct electric current. When the temperature is suitably increased, the gangue will sublimate and, depending on the degree and length of heating, a graphite of any desired degree of pureness (up to 99.9 per cent of carbon) will be obtained.

The sublimated substances will be individually precipitated from the vapors at certain temperatures and may then be treated again.

The impurities in the graphite are mainly silicic acid, aluminium oxides, pyrites, mica and a few other substances. The evaporating temperature of these substances is about 2200 degrees Celsius and less, that of carbon about 3500 degrees. The sublimation of those foreign bodies may thus be completely effected at temperatures which are between those above mentioned. However, in order to protect the inorganic graphite against the formation of carbides and silicates, coal is added which has a comparatively closer affinity to said impurities than the graphite itself. Whatever oxygen is released from the decomposing oxides will unite with the coal to form gaseous oxide of carbon, the silicic acid will be converted into carbide of silicon which, when the temperature becomes still higher, will decompose again into silicon and graphite under partial formation of oxide of carbon, the vaporous metals burning away in the air. By this method a graphite in scales is obtained which is almost chemically pure and which retains its original structure, though it is entirely free of any impurities.

The substances suited for use may be separated at certain temperatures from the escaping gases. Silicic acid and metallic oxides are precipitated in atoms. The amorphous silicic acid obtained may be used as a filtering substance, as a cleaning or polishing powder, such as an absorptive for liquid explosives or for other purposes. The metallic oxides, as the oxides of iron and aluminium, may be subjected to further metallurgical treatment. Sulfur dioxide or any other sulfurous product may be used in the manufacture of sulfuric acid.

The graphite purified in the above described manner is tested as to its resistance to very high temperatures and does no more contain volatile substances. Its liability to oxidation is considerably less than is the case with native graphites treated in a different way.

In comparison with other processes of treating and preparing graphite, the present invention offers the following advantages:

First. The graphite retains its natural structure and therefore the original size of the scales Second. The degree of pureness may be increased to almost complete chemical purity.

Third. All the graphite contained in crude ores is obtained.

Fourth. Almost all of the additions and mixtures that have been found worthless and annoying, are converted into a useful form and condition and therefore into saleable products.

What is claimed is the following:

A process of purifying graphite by electric-current-heating in which the graphite is mixed with coal and heated to temperatures of more than 2200 degrees Celsius, the gangue connected with the graphite being at the same time subjected to sublimation, individually separating the sublimating-compounds at different temperatures, and the further treating each of the said substances separately.

In testimony whereof I hereunto affix my signature in the presence of two witnesses.

MAX LANGHEINRICH.

Witnesses:
 VICTOR LOWENSTEIN,
 THEODORE COHEN.